United States Patent [19]
Yevick

[11] 4,022,647
[45] May 10, 1977

[54] METHOD OF MAKING COHERENT OPTICAL FIBER BUNDLES AND FACE PLATES

[75] Inventor: George J. Yevick, Leonia, N.J.

[73] Assignee: Personal Communications, Inc., Stamford, Conn.

[22] Filed: Dec. 17, 1974

[21] Appl. No.: 533,659

[52] U.S. Cl. .............................. 156/182; 156/193; 156/255; 350/96 B
[51] Int. Cl.² ......................................... B32B 31/00
[58] Field of Search ........... 156/182, 296, 191–192, 156/193, 250, 254–255; 350/96 R, 96 B, 96 BC

[56] References Cited
UNITED STATES PATENTS

| | | | |
|---|---|---|---|
| 3,562,746 | 2/1971 | Aron | 350/96 B |
| 3,669,789 | 3/1970 | Utsugi et al. | 156/182 |
| R27,617 | 4/1973 | Olsen | 156/255 X |

Primary Examiner—David A. Simmons
Attorney, Agent, or Firm—Thomas J. Greer, Jr.

[57] ABSTRACT

A method of making coherent optical fiber bundles and coherent optical fiber face plates. The method includes the steps of forming a laminated billet by heat and pressure from a plurality of stacked disc modules. Each disc module is defined by two transparent discs, one relatively thick and having one index of refraction and the other relatively thin and having an index of refraction less than the first. The billet is then longitudinally skived to form a veneer strip of indefinite length. The veneer is then coated on one or both faces by transparent sheets having similar optical properties, i.e., different indices of refraction, and may include a light-absorbing or light reflecting layer on one sheet. A second billet is formed and transversely cut to define a fiber optic face plate. A second billet may also be formed and skived to yield a coherent fiber optic bundle.

4 Claims, 17 Drawing Figures

U.S. Patent  May 10, 1977  Sheet 1 of 5  4,022,647
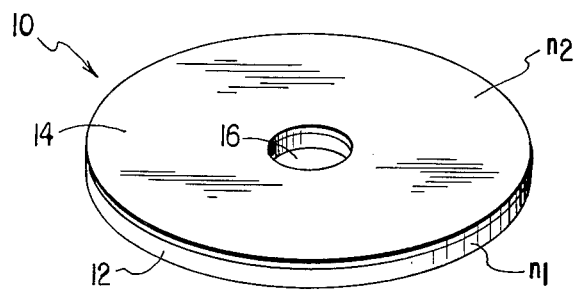
FIG. 1
FIG. 2
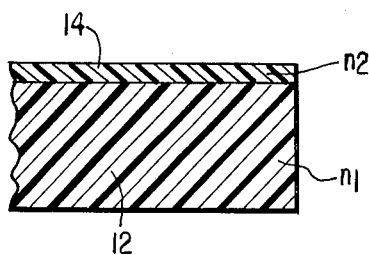
FIG. 3
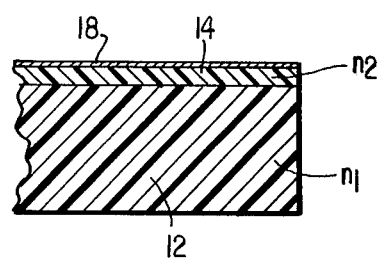
FIG. 4
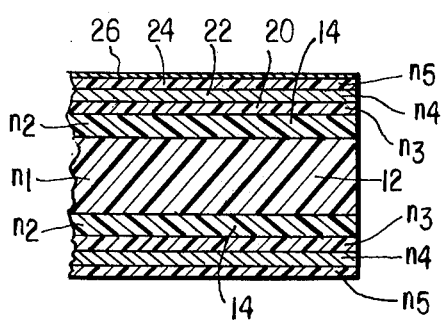
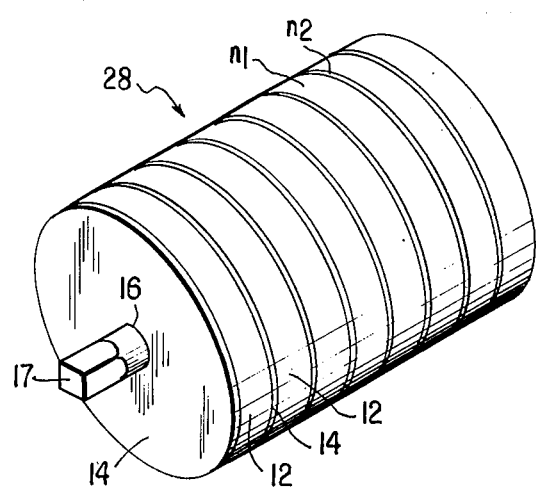
FIG. 5

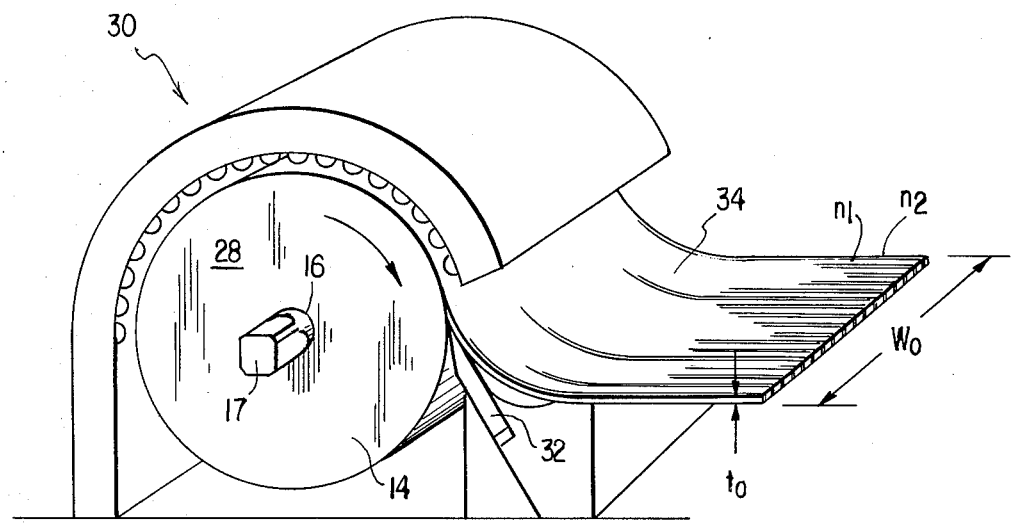
FIG. 6
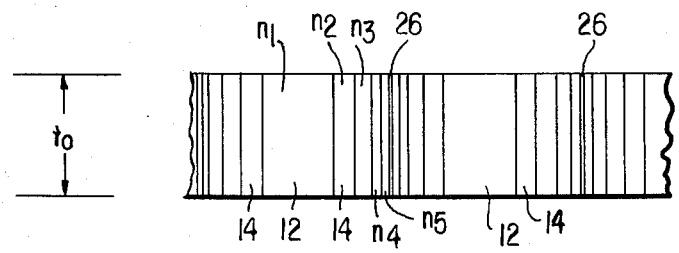
FIG. 7
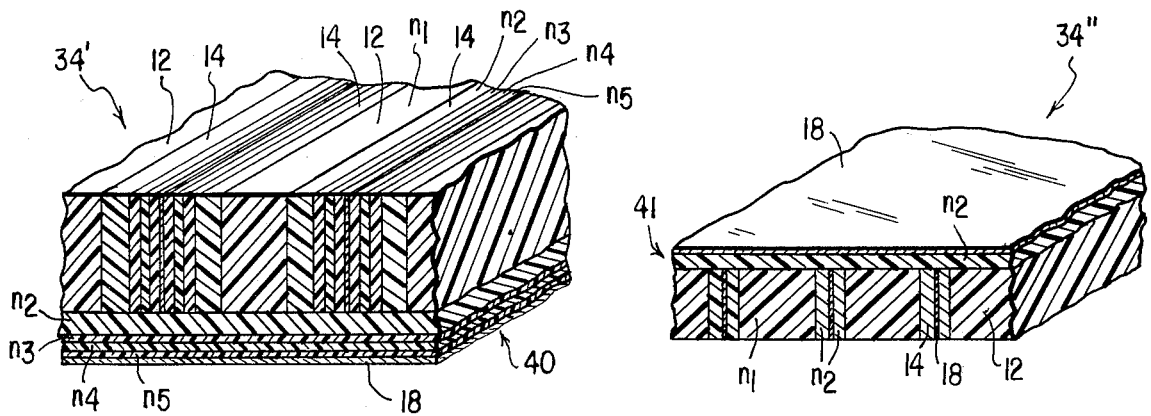
FIG 8
FIG. 9

FIG. 14
FIG. 15
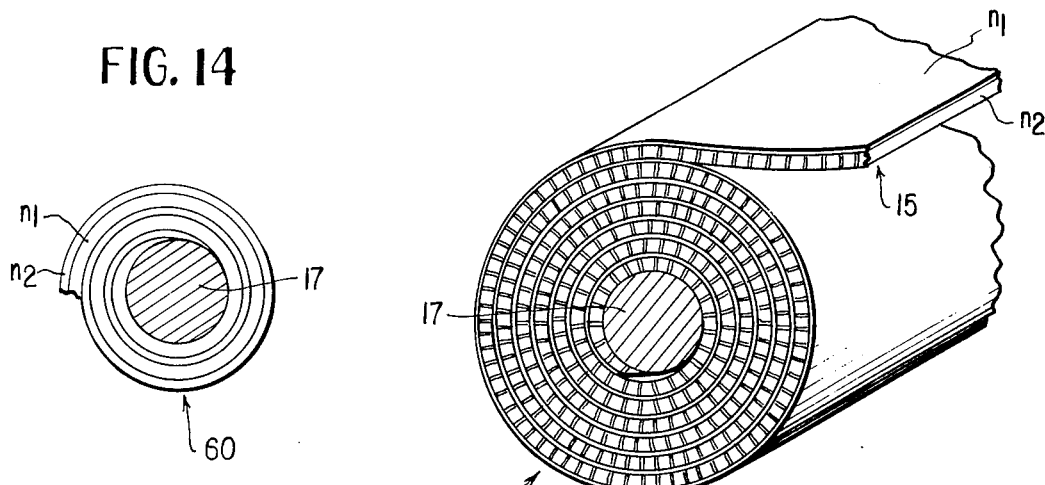
FIG. 16
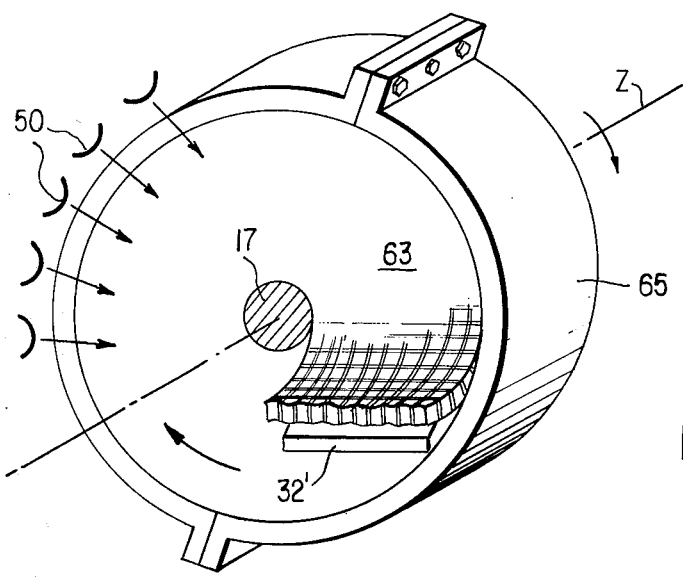
FIG. 17
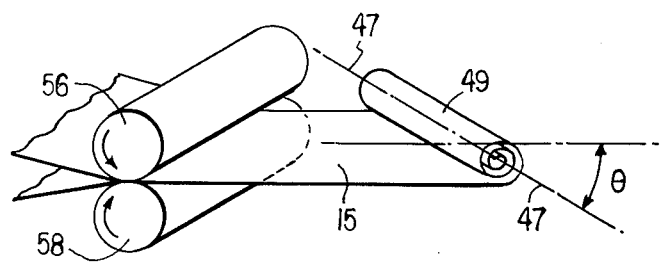

METHOD OF MAKING COHERENT OPTICAL FIBER BUNDLES AND FACE PLATES

This invention relates to fiber optic bundles and face plates and more particularly to methods of making them.

A coherent fiber optic bundle is defined by a plurality of fibers of transparent material each of which have been coated on its surface so that light entering one end will be totally internally reflected and will pass out the other end of the fiber. When bundles of these fibers are formed, one end of the bundle may be used as a transmitter and an object adjacent this end will appear at the other end of the bundle, no matter (within limits) how far the ends are separated or the number of twists, loops, or turns between the input and the output ends of the bundles. A face plate is defined by such a bundle whenever the length of the bundle is relatively short and its width rlatively great. Such bundles exhibit utility in the television art. The manufacture and use of internally reflecting fiber optic devices, such as coherent fiber bundles, is well known and has engaged the attention of many workers in the optic art for a number of years.

In spite of the relatively long time in which such devices have exhibited utility, the methods of manufacture of such fiber optic devices have been rather extensive. Each individual fiber, it will be recalled, is coated with a substance having an index of refraction less than the index of refraction of the fiber itself. These coated fibers must them be gathered together to form a bundle, or a face plate, or other fiber optic device, and such procedures have generally been relatively expensive. According to the practice of this invention, fiber optic face plates and coherent fiber bundles may be made in a relatively simple and inexpensive manner. According to the process of this invention, a plurality of transparent discs each coated with a thinner disc having a lesser index of refraction are placed on top of one another to form a billet. The billet is subjected to heat and pressure to thereby fuse or join the disc elements and then the cylindrical surface of the billet is skived by a skiving knife to form a veneer. At least one face of the veneer is, in turn, coated with a transparent plastic sheet, itself coated with a substance having a lesser index of refraction than the plastic sheet. The thus coated veneer defines a single layer of totally internally reflecting optical fibers, each fiber being rectangular in cross-section. The sides of each fiber are defined by the thin coating on the disc having the smaller index of refraction, while the top and bottom of the fibers are defined by transparent plastic sheet coating. Such a layer may be stacked or juxtaposed with respect to other layers to thereby define a bundle of coherent optical fibers.

The invention exhibits particular utility as a viewing screen in the apparatus described in my now U.S. Pat. No. 3,864,034, dated Feb. 4, 1975.

IN THE DRAWINGS

FIG. 1 is a perspective view of a single disc module employed in the fabrication technique according to this invention.

FIG. 2 is a transverse cross section of FIG. 1.

FIG. 3 is a view similar to FIG. 2 and showing a modification.

FIG. 4 is a view similar to FIG. 2 and showing a further modification.

FIG. 5 is a view showing a plurality of disc elements of FIG. 1 assembled to form a billet.

FIG. 6 is a view showing the skiving of a billet such as shown in FIG. 5, after being subjected to suitable heat and pressure, to thereby form a veneer.

FIG. 7 is a transverse cross section of a skived veneer from a billet formed by juxtaposing disc modules such as shown in FIG. 4.

FIG 8 is a view showing the veneer of FIG. 7 and which has been coated on one side.

FIG. 9 is a view showing a veneer formed from a billet using the disc modules of FIG. 3 and coated on one surface.

FIG. 14 is a partial cross sectional view of the second billet shown at FIG. 13.

FIG. 15 is a view similar to FIG. 12 and illustrates an embodiment.

FIG. 16 is a partially schematic perspective view illustrating end skiving for the purpose of producing coherent fiber optic face plates.

Figure 10:
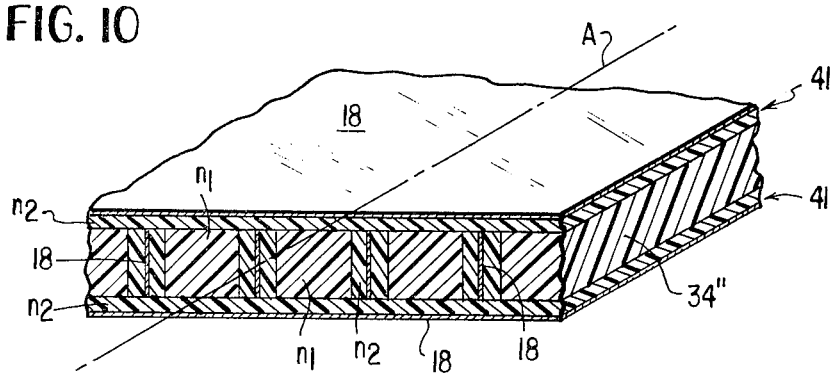
FIG. 10 is a view showing FIG. 9 coated on both surfaces.

Referring now to FIGS. 1 and 2 of the drawings, the numeral 10 denotes generally a disc module defined by a first disc or first layer 12 having an index refraction $n_1$ and a second and thinner layer or disc 14 having a smaller index of refraction $n_2$. Each disc is provided with a central aperture to define a composite central aperture for the module denoted by the numeral 16. The disc module 10 may also be formed by stamping from a single two layered sheet having indices of refraction $n_1$ and $n_2$. Alternatively, a disc module may include not only the two elements shown at FIG. 2 but may include a coating 18 of a light absorbing material such as carbon black, or a reflecting material such as vacuum-deposited aluminum or other silver like material. At FIG. 4, yet another modular disc ensemble is illustrated in partial cross-section wherein the main or thickest disc 12 is coated on both sides, not only with a thinner layer 14 of a lower index of refraction, but additional layers 20, 22, and 24, as well as a light absorbing or light reflecting substance 26 similar to substance 18. The relationship between the several indices of refraction is such that the indices decrease in passing away from the thickest disc 12.

Referring now to FIG. 5 of the drawings, the disc modular elements 10 are stacked or juxtaposed to form a billet denoted generally by the numeral 28. A metal shaft 17 extends through each of the apertures 16 and is provided at one end with the illustrated rectangular cross section. The billet 28 is subjected to heat and pressure and then skived, in an apparatus denoted generally by the numeral 30, by skiving knife 32 to form a veneer 34. The apparatus and method required to transform the stack or billet 28 of FIG. 5 into a billet shown in FIG. 6 suitable for skiving to form the veneer, and other operating conditions necessary to carry out the veneering, are fully illustrated and explained in U.S. Pat. Re. No. 26,617 issued to Olsen, the teachings of which are hereby incorporated by reference.

FIG. 7 represents a typical transverse cross-section of a veneer such as 34 of FIG. 6 when modular disc elements such as shown at FIG. 4 are employed to form the billet 28 of FIG. 5 and the subsequent skiving operation indicated at FIG. 6.

Referring now to FIG. 8 of the drawings, a partial perspective cross section of a veneer is illustrated wherein the veneer is formed by a skiving operation similar to that disclosed by the mentioned Olsen patent, but commencing with a disc module having a central disc of index of refraction $n_1$ and four additional discs coated on one side of it, such as shown at FIG. 4. One face of a veneer 34' (formed similarly to veneer 34) of FIG. 8 is provided with a coating 40 defined by transparent sheets having indices of refraction $n_2$, $n_3$, $n_4$, $n_5$, and a light absorbing or reflecting layer 18. The layers have the indicated indices of refraction, with the indices of refraction diminishing with increasing subscript. FIG. 9 is a partial perspective view showing a veneer 34" which is formed with the modular disc elements shown at FIG. 3. To this veneer a transparent sheet having index of refraction $n_2$ is joined to one surface, with the light absorbing substance such as 18 of FIG. 3 on top of that sheet.

FIG. 10 is a view similar to FIG. 9, wherein instead of only one veneer surface being added, both faces of the veneer 34" are coated with transparent sheets to thereby produce a single layered coherent fiber sheet.

Figure 11:
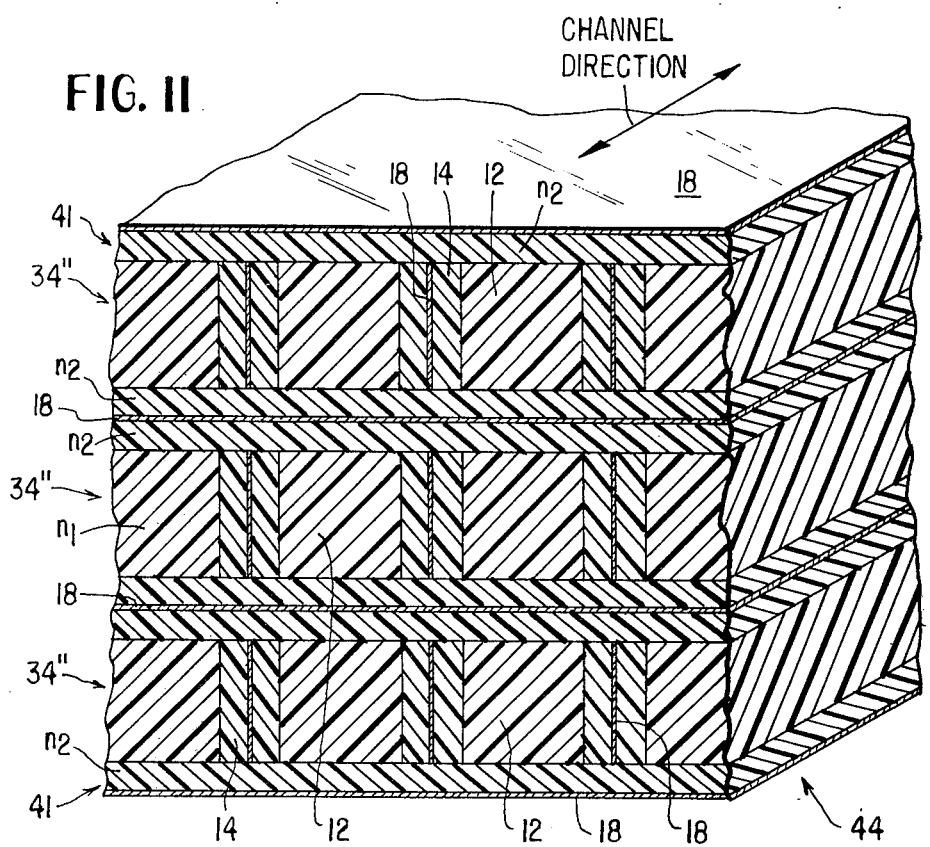
FIG. 11 is a partially schematic perspective cross-sectional view showing the coated veneer of FIG. 10 stacked or juxtaposed to form a three layer coherent fiber optic sheet.

Referring now to FIG. 11 of the drawings, three coherent fiber sheets of FIG. 10 are illustrated as juxtaposed or stacked on top of each other to form a three layered coherent fiber sheet 44. The reader will observe that, as is in the case of FIG. 10, the light conducting channels or fibers of the ensemble, denoted by the numeral 44, are rectangular in cross section. The light absorbing or, alternatively, the light-reflecting, coating adjacent the coating having an index of refraction $n_2$ is positioned as illustrated, with the direction of the light channels as indicated.

Figure 12:
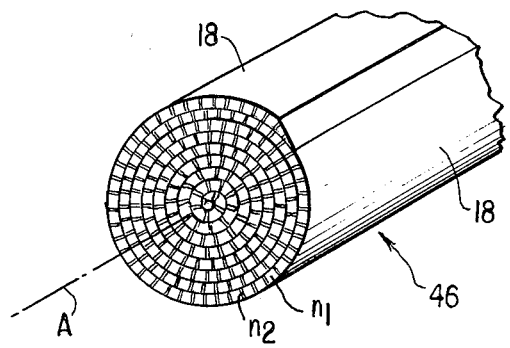
FIG. 12 is a perspective view showing the single layer coherent fiber sheet of FIG. 10 after it has been wrapped about an imaginary axis A of FIG. 10 to form a coherent fiber bundle.

Referring to FIG. 12 of the drawings, a spiral bundle is illustrated and may be formed by wrapping the sheet of FIG. 10 about an axis parallel to axis A, commencing at one edge of the sheet. The cross section of the bundle is spiral. The structure shown at FIG. 12 is a coherent fiber bundle. If desired, a face plate may be formed by transversely cutting the illustrated coherent bundle of FIG. 12 into slices.

Figure 13:
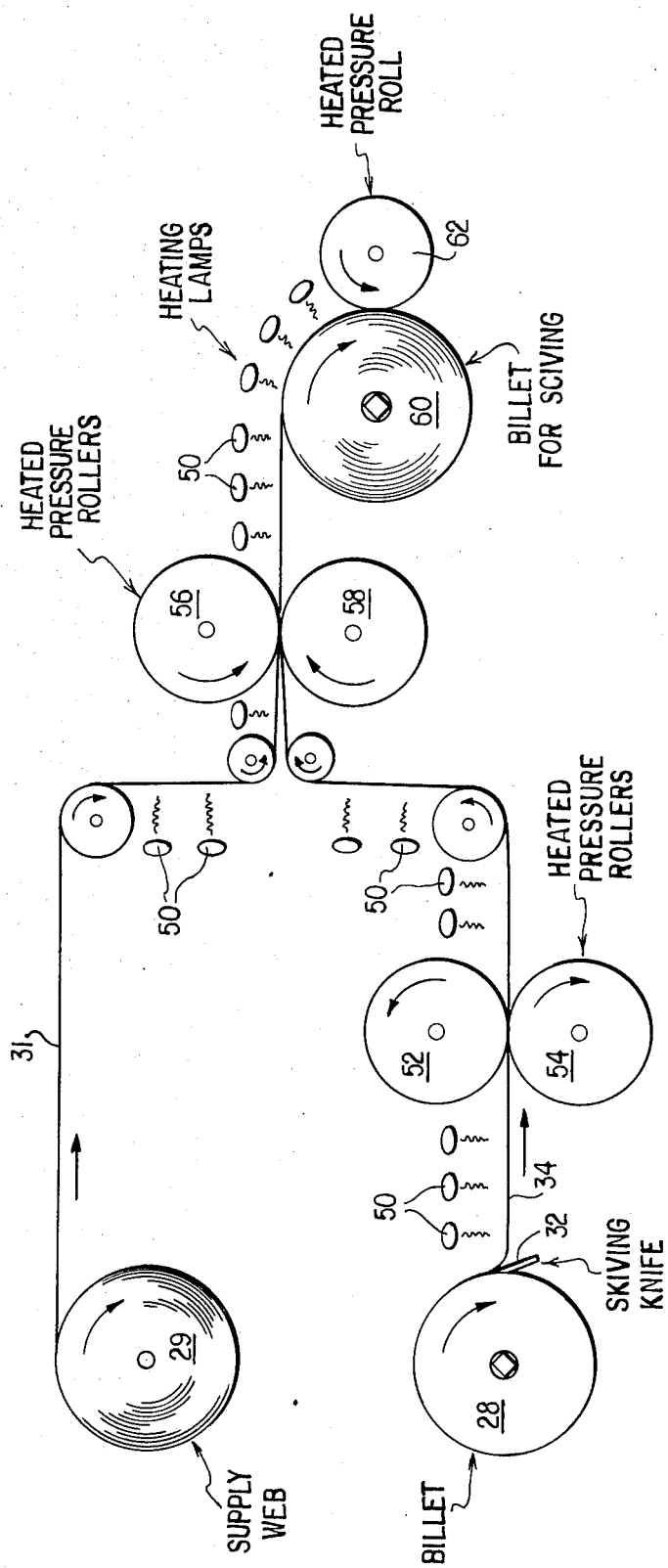
FIG. 13 is a partially schematic view illustrating how a second billet is formed, the second billet adapted to be skived to define fiber optic sheets of any desired thickness.

An apparatus and process for forming a thick, coherent fiber optic sheet, such as that illustrated at FIG. 11, is shown at FIG. 13. The numeral 28 denotes a billet such as the billet bearing the same numeral at FIG. 6. That is to say, the billet 28 of FIG. 13 is a heat treated and laminated billet such as is denoted by the numeral 10 of FIG. 2 of the mentioned Olsen patent. A skiving knife, again denoted by the numeral 32, forms a veneer 34. A supply roll 29 rotates in the indicated direction and unwinds a transparent web 14 having an index of refraction $n_2$. The veneer 34 may then pass between heated pressure rollers 52 and 54, while supply roll 29 is also unwinding. Heat lamps 50 heat the two webs 14 and 34, these webs coming together in juxtaposed relation at the nip of heated pressure rollers 56 and 58. Additional heating lamp elements 50 maintain a desired temperature of the now laminated layers and drum 60 is formed by winding the composite of 14 and 34 as indicated at the insert of FIG. 13. Heated pressure roll 62 may be employed to maintain desired pressure and tension. A transverse cross section of the billet 60 of FIG. 13 is shown at FIG. 14. As indicated at FIG. 14, rectangular in cross-section light conducting channels lie in planes which are orthogonal to the longitudinal axis of billet 60.

Billet 60 is now longitudinally skived, in a manner entirely similar to that shown at FIG. 6, to a desired skiving depth. For example, if the skiving depth is equal to the thickness of three of the sheets shown at FIG. 10, the resulting veneer would be as shown at FIG. 11. For a thicker veneer, the skiving depth is simply increased. A multilayered coherent sheet is thereby generated by this second skiving operation.

FIG. 15 is a partially schematic perspective view illustrating a spiral wound billet formed by winding a veneer such as shown at FIG. 10 around a steel shaft 17 having an axis parallel to axis A of FIG. 10.

Referring now to FIG. 16, a skiving operation is indicated wherein a billet, such as the billet shown at FIG. 15, is skived by knife 32' suitably mounted and supported adjacent one end of the billet. The billet 63 is encased in cylindrical jacket 65, the periphery of the billet being adhesively secured to both the interior of jacket 65 and the exterior of shaft 17. As the ensemble of FIG. 16 is rotated, except for knife 32', in the indicated direction, the skiving knife 32' advances at a uniform rate into the end of the billet 63, parallel to axis Z. The resultant skived veneer is in the form of an edgewise wound, flat spiral spring. Heat lamps 50 adjacent the face end of billet 63 are employed to assist the skiving operation.

Coherent fiber optic face plates may be formed by stamping out sections of the veneer. The optical channels of the veneer are normal to its plane.

Referring now to FIG. 17 of the drawings, a modified process is illustrated wherein the web 15 after passing through the nip of rollers 56 and 58 is initially cut and thence wrapped, starting at one corner thereof, about an axis 47 at an angle theta with respect to the longitudinal axis of the web 15, to thereby form a coherent fiber optic bundle 49. The bundle 49 carries light conducting channels similar to the light conducting channels of the devices shown at FIGS. 12 and 15. However, instead of the channels running parallel with the longitudinal axis of the fiber bundle, each channel of bundle 49 will define or form a helical light path whose pitch is determined by the angle theta. Although the individual light conducting paths are in a helical form, the resultant bundle will be coherent. It will exhibit a difference in behavior from the bundles shown at FIGS. 12 and 15 only in that, depending upon its length, the image transmitted to the far end from the input or object end of the bundle can be rotated from 0° to 360° with respect to the input. In the event that no such angular rotation is desired, the bundle need only be twisted to effect the desired orientation or angular relationship between the input and the output.

It will be understood that the wrapping of web or sheet 15 may be done continuously, as indicated at FIGS. 13 and 17, or, alternatively, the web may be cut and then wrapped.

I claim:

1. A method of making a plurality of coherent optical fibers, including the steps of, a. forming a laminated cylindrical billet of modular disc elements, each said modular element including at least two transparent layers of different indices of refraction, b. skiving to produce a veneer from the outer cylindrical surface of said billet, said veneer defining a sheet of the skiving depth and having a longitudinal axis orthogonal to the long axis of the billet and having longitudinally running laminae of alternately different indices of refraction, c. coating at least one surface of said veneer with a transparent sheet having an index of refraction less than the higher index layer of said veneer, and d. wrapping said now coated veneer around an axis orthogonal to its longitudinal axis to thereby form a second billet.

2. The method of claim 1 including the additional step of:

a. skiving the cylindrical surface of said second billet to thereby generate a coherent optical fiber sheet of a width equal to the length of the second billet and of a thickness equal to the depth of the last-mentioned skiving step.

3. A method of making a plurality of coherent optical fibers, including the steps of, a. forming a laminated cylindrical billet of modular disc elements, each said modular element including at least two transparent layers of different indices of refraction, b. skiving to produce a veneer from the outer cylindrical surface of said billet, said veneer defining a sheet of the skiving depth and having a longitudinal axis orthogonal to the long axis of the billet and having longitudinally running laminae of alternately different indices of refraction, c. coating at least one surface of said veneer with a transparent sheet having an index of refraction less than the higher index layer of said veneer, and d, wrapping said now coated veneer around an axis less than 90° to the longitudinal axis of the veneer to thereby define a cylinder having light conducting, optical channels, and e. skiving the end of said cylinder in a direction proceeding along the longitudinal axis of the cylinder to thereby generate a spiral sheet in the general form of a spring, which spiral sheet may then be cut to form a coherent fiber optical face plate.

4. A method of making a plurality of coherent optical fibers, including the steps of, a. forming a laminated cylindrical billet of modular disc elements, each said modular element including at least two transparent layers of different indices of refraction, b. skiving to produce a veneer from the outer cylindrical surface of said billet, said veneer defining a sheet of the skiving depth and having a longitudinal axis orthogonal to the long axis of the billet and having longitudinally running laminae of alternately different indices of refraction, c. coating at least one surface of said veneer with a transparent sheet having an index of refraction less than the higher index layer of said veneer, and d. wrapping said now coated veneer around an axis less than 90° to the longitudinal axis of the veneer to thereby define a cylinder having light conducting, optical channels, and e. transversely cutting said cylinder into slices to thereby form coherent fiber optic face plates.

* * * * *